Nov. 24, 1931. F. ROSSMAN 1,833,535
LAWN TRIMMING DEVICE
Filed Feb. 28, 1930
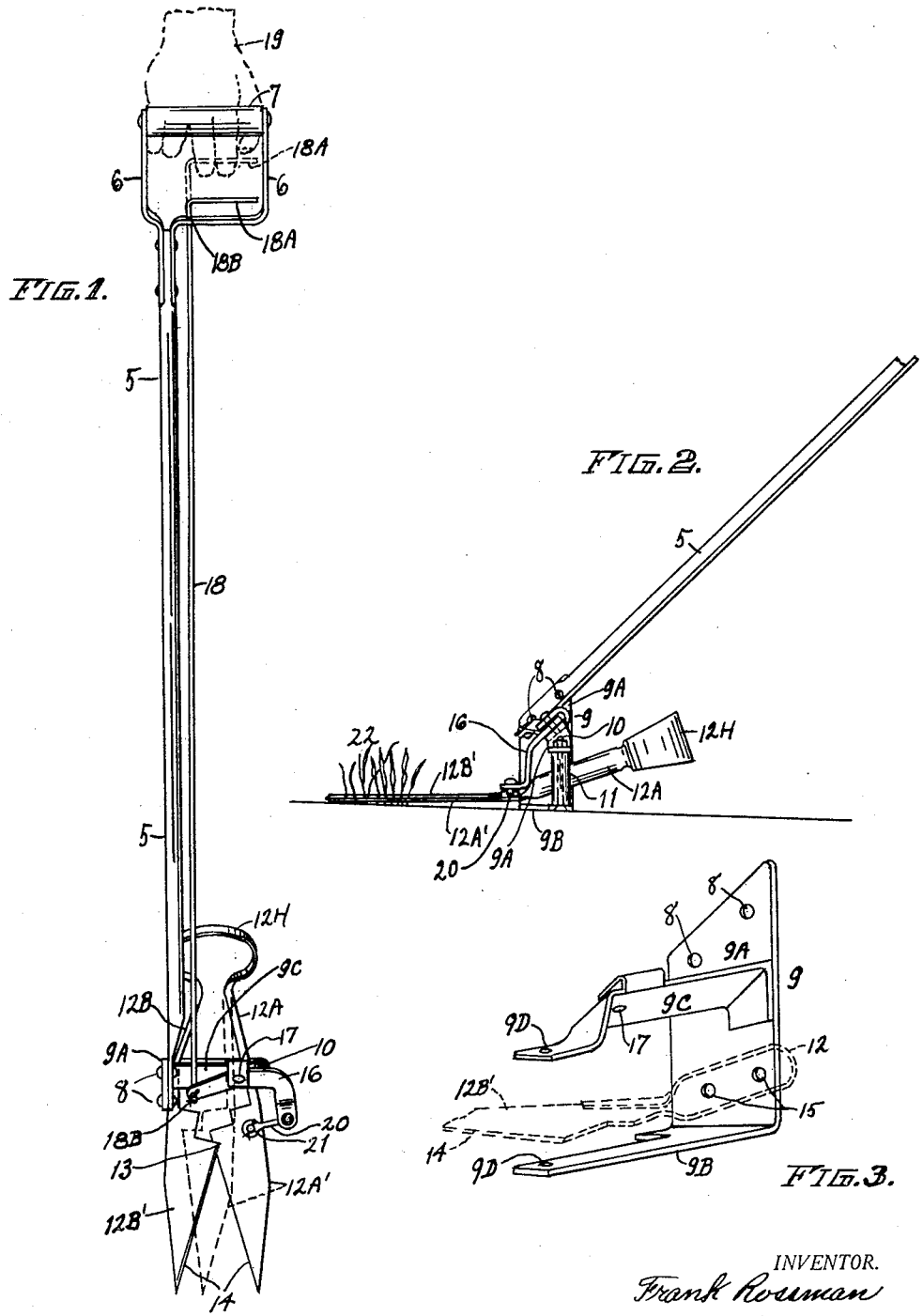

Patented Nov. 24, 1931

1,833,535

UNITED STATES PATENT OFFICE

FRANK ROSSMAN, OF ST. PAUL, MINNESOTA

LAWN TRIMMING DEVICE

Application filed February 28, 1930. Serial No. 432,040.

My invention relates to lawn trimming devices in general and more particularly to a new type of grass and weed shearing devices and the main object is to provide a simple and highly efficient device of such construction and operation that it may be operated by one hand while the operator remains in standing position. The device is particularly useful for trimming grass growing up near a hedge, wall, sidewalk or other places hitherto difficult to reach except by an operator using hand shears and moving along on all fours to reach places otherwise difficult of access. My invention embodies the use of well known type of ordinary grass clippers.

The device is hereinafter fully described, reference being had to the accompanying drawings, in which,—

Fig. 1 is a top view of my complete device in operative position.

Fig. 2 is a side elevation of the lower half of Fig. 1 looking toward the latter from the right and showing the clippers in cutting action.

Fig. 3 is a detail perspective view of the main frame or clipper holding frame of the device in enlarged scale.

Referring to the drawings by reference numerals 5 designates an elongated handle of suitable material, the upper end of said handle being U-shaped or forked as 6 and the upper part of the latter forked part closed by a transverse grip 7. The entire handle part may be offset from the main bar or handle 5 as shown. The lower end of said handle is secured preferably detachably, as with screws 8 to the upper part of a vertical plate 9A of a metal frame 9, the handle extending in inclined plane upwardly and rearwardly therefrom as shown.

This frame has a lower arm 9B extending sideways and integrally from part 9A and an upper arm 9C parallel thereto, said latter arm being flat and fixed mainly in inclined plane. The outer end of both arms register vertically and are drilled as at 9D for a through bolt 10 connecting them and between said arms, about the bolt 10 is a suitable spacer 11.

Within the frame 9 I fix a pair of grass-clippers of the well known hand operated type having a spring metal loop-shaped head 12H from which extend the spreading arms 12A—12B to the forward ends of each of which is fixed a tapered cutting blade 12A'—12B' respectively. Said blades are usually overlapped slightly as at 13 at their rearmost cutting edges, said edges being designated 14. This type of clippers is well known in the art and their use manipulation also likewise well known. In my device one arm of such clipper, as 12B is fixed rigidly to the inner side of plate 9A as at 15 in Fig. 3 where said arm and its integral blade 12B' are shown dotted, both blades 12A' and 12B' extending forward from the frame 9 and in a plane slightly above arm 9B (see Figs. 2 and 3).

In this device means are provided for reciprocating or closing arm 12A' toward 12B', spring 12H causing the blades to be spread apart. These means comprise a small beam-lever 16 fulcrumed at 17 in the arm 9C and said lever oscillatable in a plane parallel to the face of said arm 9C. One end of said lever is near the plate 9A and has an aperture for pivotal engagement of the front end of a reach rod 18, as at 18B, which rod extends thence upwardly and parallel to handle 5, its upper part extending slidably through a member 6 of the handle as at 18B and within the handle, said rod may be bent at right angles to form a short arm 18A parallel with grip 7.

The operator's hand 19 grasps the grip 7 and two or more of his fingers engage the rod arm 18A to pull the latter toward the grip for the purpose of closing the blades and cutting grass, weeds, etc., between them, as follows:

The previously described lever 16 has its outer arm part extending forward and downwardly and its latter end drilled at 16 for pivotal connection of a link 20. Said link extends toward the adjacent blade 12A' and is pivotally connected to a stud 21 or equivalent means fixed on said blade (see Fig. 1). Obviously, when an operator causes the blades to cut by their closing action he simply makes a series of pulling actions on bar 18A to close the blades and the spring action at 12H successively opens the blades when pulling action on 18A ceases.

The rod 18 simply pulls on the inner arm of lever 16, the outer arm thereof being moved forward and inward causing link 20 to push blade 12A' toward blade 12B' as to position indicated by dotted lines in Fig. 1. The grass clipper member is easily removable from the device by simply releasing the screws 15 and disconnecting link 20. In Fig. 2, 22 indicates a number of blades of grass being cut off by the device.

It is further obvious that my device is operable by being moved along the surface, riding on the bare arm 9B of the frame if desired, the operator remaining on his feet and manipulating the device with one hand only.

The usefulness of my device and its preferred construction have now been fully disclosed. Variations in details of construction, proportions of parts, etc., may be embodied without departing from the scope and spirit of the invention.

I claim:

1. In a lawn trimmer, the combination with a pair of shears having spring means normally spreading the blades, of a shear holding frame of L-shape and the vertical arm thereof fixed to one of said blade members of the shears, the base of said frame extending horizontally and in a direction transversely of said shears and rearwardly of the blades, a handle bar fixed to the upper part of said frame arm and extending in an inclined plane upwardly therefrom and rearwardly from the shears, a D-handle comprising the rear terminus of said handle bar, said lower arm of the frame being flat and in a plane with said blades of the shears and adapted to ride on the ground when the device is moved forward, said frame comprising further an upper integral arm extending horizontally from its upright part and over the lower arm, an L-shaped lever fulcrumed on said upper arm to be oscillated in an angular plane corresponding to the direction of the handle-bar and comprising a horizontal arm, and a downwardly directed arm exteriorly of its fulcrum, a link member connecting the terminus of said latter arm with the free blade of the shears, a reach rod pivotally connected to the horizontal arm of said lever and extending parallel to the handle bar to said D-handle, and means on said reach rod operable within the D-handle to cause the shears to operate.

2. The structure specified in claim 1 in which said latter means comprise a transverse finger hold comprising an integral part of said reach rod within the D-handle.

In testimony whereof I affix my signature.

FRANK ROSSMAN.